United States Patent [19]
Atac et al.

[11] Patent Number: 5,742,659
[45] Date of Patent: Apr. 21, 1998

[54] HIGH RESOLUTION BIOMEDICAL IMAGING SYSTEM WITH DIRECT DETECTION OF X-RAYS VIA A CHARGE COUPLED DEVICE

[75] Inventors: Muzaffer Atac, Wheaton, Ill.; Timothy A. McKay, Ann Arbor, Mich.

[73] Assignee: Universities Research Assoc., Inc., Washington, D.C.

[21] Appl. No.: 697,536

[22] Filed: Aug. 26, 1996

[51] Int. Cl.$^6$ .................................................. H05G 1/64
[52] U.S. Cl. ................... 378/98.8; 378/98.7; 250/370.01
[58] Field of Search ........................... 378/98.7, 98.8; 250/370.01, 370.08, 370.09

[56] References Cited

U.S. PATENT DOCUMENTS

| | | |
|---|---|---|
| 4,870,279 | 9/1989 | Cueman et al. . |
| 4,905,265 | 2/1990 | Cox et al. ................. 250/370.09 X |
| 4,973,845 | 11/1990 | Mastrippolito et al. . |
| 5,142,557 | 8/1992 | Toker et al. . |
| 5,177,775 | 1/1993 | Onodera et al. . |
| 5,262,649 | 11/1993 | Antonuk et al. . |
| 5,308,986 | 5/1994 | Walker . |
| 5,379,336 | 1/1995 | Kramer et al. . |
| 5,391,879 | 2/1995 | Tran et al. . |
| 5,493,122 | 2/1996 | Farr ............................ 250/370.01 |
| 5,583,905 | 12/1996 | Nishiki et al. ................ 378/98.8 |

OTHER PUBLICATIONS

Federal Lab Manufacturing Tech Briefs, "Digital Mammography System Improves Detection Rates", by Lawrence Livermore National Laboratory, Mar. 1995 Issue.

Fundamentals of Semiconductor Devices, "Charge-Transfer Devices", by Edward S. Yang, McGraw-Hill Book Company, 1978 no month.

*Primary Examiner*—David P. Porta
*Attorney, Agent, or Firm*—McAndrews, Held & Malloy, Ltd.

[57] ABSTRACT

An imaging system is provided for direct detection of x-rays from an irradiated biological tissue. The imaging system includes an energy source for emitting x-rays toward the biological tissue and a charge coupled device (CCD) located immediately adjacent the biological tissue and arranged transverse to the direction of irradiation along which the x-rays travel. The CCD directly receives and detects the x-rays after passing through the biological tissue. The CCD is divided into a matrix of cells, each of which individually stores a count of x-rays directly detected by the cell. The imaging system further includes a pattern generator electrically coupled to the CCD for reading a count from each cell. A display device is provided for displaying an image representative of the count read by the pattern generator from the cells of the CCD.

18 Claims, 10 Drawing Sheets

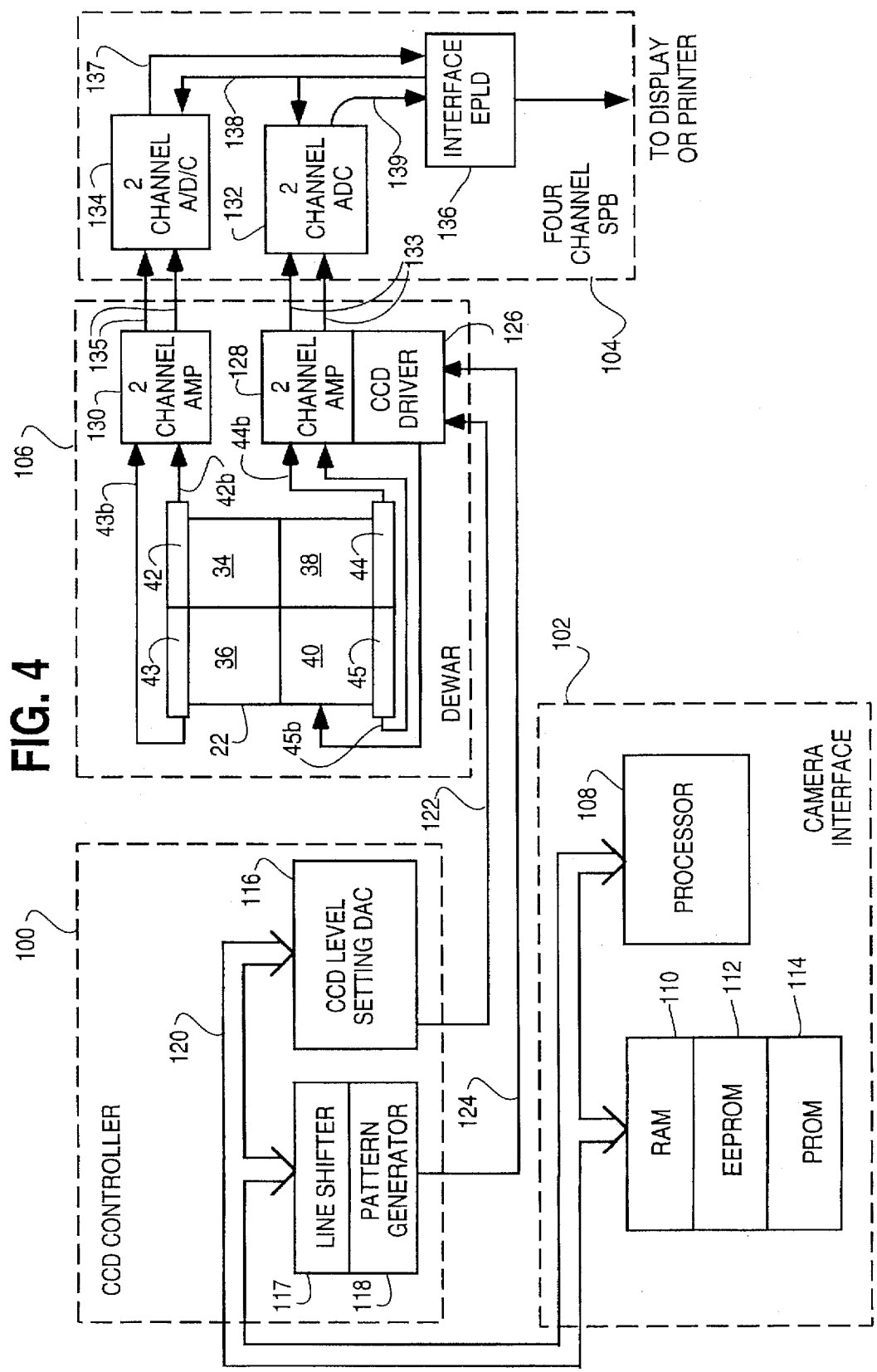

FIG. 5A
ONE CORNER READOUT
FIG. 5B
TWO CORNER READOUT
FIG. 5C
FOUR CORNER READOUT
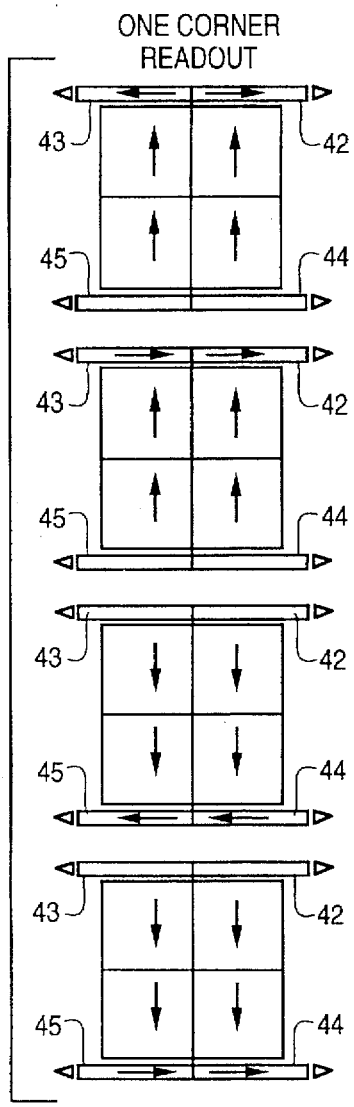
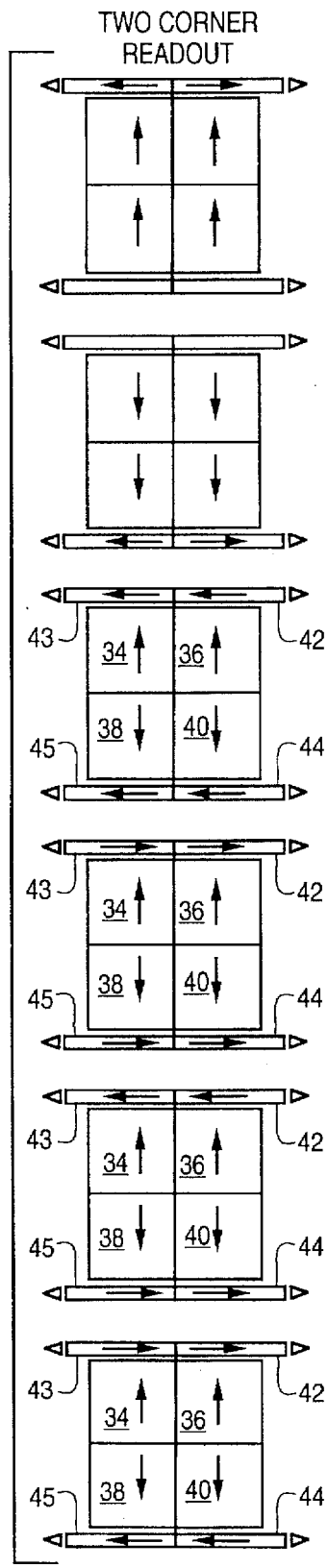

HIGH RESOLUTION BIOMEDICAL IMAGING SYSTEM WITH DIRECT DETECTION OF X-RAYS VIA A CHARGE COUPLED DEVICE

This invention was made with Government support under Contract No. DE-AC02-76CH03000 awarded by the U.S. Department of Energy. The Government has certain rights in this invention.

FIELD OF THE INVENTION

The present invention generally relates to the field of biomedical imaging devices, and more specifically, to x-ray biomedical imagery which affords high resolution through direct detection of x-rays via a charge coupled devices.

BACKGROUND OF THE INVENTION

In the past, x-ray imaging systems have been proposed for use in biomedical applications, such as for real-time examination of organic and inorganic subjects. By way of example, such biomedical applications may include mammography testing, tumor identification within organs, biological sample drug screening and the like.

Conventional x-ray imaging systems may be classified as radiographic and fluoroscopic. In radiographic imaging, x-ray images are generally recorded on film which must be developed before the image may be viewed. In fluoroscopic imaging, consecutive images may be obtained and presented to the physician during the diagnostic test (i.e., in real-time).

Conventional fluoroscopic imaging systems locate an x-ray conversion layer proximate the subject to be examined. The conversion layer converts incident radiation to light (e.g., photons to electrons), such as through a $C_sI$ screen and the like. The light is captured and converted to an image, such as through a camera, a charge coupled device (CCD) and the like. In a conventional CCD device, the conversion layer is located directly above and in contact with a phosphorus or scintillating layer which is directly above and in contact with the charge coupled device (CCD). The photon to electron conversion layer merely represents an extremely thin copper sheet or a comparably thin layer of tungsten, lead or other suitable material.

In the past, fluoroscopic imaging systems have experienced limited success in biomedical applications owed to poor image resolution and other defects. Physicians were unable to identify extremely small potentially cancerous tumors since existing imaging systems offered insufficient spacial and energy resolution. Unfortunately, the probability of successfully treating a tumor decreases as the tumor develops and as its size increases.

The foregoing difficulties are particularly prevalent in applications which require high resolution imaging, such as in mammography applications for detection of breast cancer. As tumors within the breast develop, the tumor may remain, for some time, quite small in size and subtle in contrast. Consequently, mammography systems require extremely high spacial and energy resolution. Conventional mammography systems are further complicated by the need to minimize the x-ray dosage per test to minimize the dangers of routine screening.

Conventional imaging devices are described in U.S. Pat. No. 5,379,336 to Kramer and in U.S. Pat. No. 5,262,649 to Antonuk et al., the complete disclosures of which are incorporated herein by reference. As explained in the Kramer patent, charge coupled devices (CCDs) have been provided proximate the scintillating or phosphorus layer to detect visible light emitted from the scintillating or phosphorus layer. The CCD converts the incident visible light to an electrical charge which is stored within cells of the CCD.

However, conventional CCD-based imaging devices have experienced serious deficiencies. As noted in the above incorporated patents to Kramer and Antonuk, CCD-based imaging devices are relatively bulky, thereby creating a hinderance in various clinical procedures.

Further, conventional CCD-based imaging devices afford limited sensitivity and resolution due to smearing, distortion, glare and spacial blurring by the layers between the subject and CCD. More specifically, as an x-ray contacts the conversion, phosphorus or scintillating layers, photons emitted therefrom project along multiple trajectories or paths. The paths, along which the photons are emitted, do not necessarily directly correspond to the incident angle of the originating x-ray upon the phosphorus or scintillating layer. Consequently, when multiple incoming x-rays contact the scintillating material simultaneously or in close proximity in time, the photons emitted in response to each x-ray travel along overlapping paths, thereby creating a distorting or smearing effect which reduces resolution at the CCD. In addition, the x-ray must pass through multiple intermediate steps before final conversion to a stored electrical charge. As the number of intermediate steps increases between the originating x-ray and resultant stored charge, the system sensitivity decreases.

Heretofore, CCD-based imaging devices have been unable to detect x-rays directly and without the aforementioned intermediate step of converting the x-ray to photons and invisible light. But for the conversion layer, a majority of the x-rays pass undisturbed through the CCD layer and thus go undetected. The number of x-rays detected by a phosphorus or scintillating layer and the number of photons detected by the CCD are representative of that device's efficiency. Hence, to be effective, conventional CCD-based imaging devices require a conversion layer.

The patents to Kramer and Antonuk attempt to address some of the above discussed deficiencies of CCD-based imaging devices by entirely avoiding CCD technology. Instead, the device proposed by Antonuk utilizes a thin film, flat panel, pixelated detector array based on amorphous silicon technology. The device proposed by Kramer utilizes a pixel array configuration, based on hybrid semi-conductor technology. Kramer's hybrid pixel array includes a detector array formed on a first semiconductor substrate and a read-out chip or array formed on a second semi-conductor substrate. The detector layout is preferably formed of a high sensitivity low-doping concentration substrate. The read-out chip or array is preferably implemented with a low restivity substrate. Forming each substrate with different characteristics enables enhanced operation of Kramer's detector and read-out arrays. The detector and read-out arrays are interconnected through an indium bonding process. The pixels within Kramer's detector array convert x-rays to stored electrical signals. The electrical signals are delivered to the read-out chip via the interconnects.

However, Kramer's hybrid pixel array has met with limited success. Kramer's hybrid pixel array requires separate manufacturing of the detector and read-out arrays and the further step of interconnecting each pixel of the detector array to the read-out array. This process is costly and unpredictable. In Kramer's preferred embodiment, a 256× 256 array of 30×30 micron pixels is approximately 7.68 millimeters square. The array of Kramer's preferred embodiment is too small to be commercially useful. Thus, Kramer's design must be enlarged several times over to achieve an array of sufficient size for commercial use. However, today's manufacturing techniques are not sufficiently advanced to effectively produce larger pixel arrays having the construction of Kramer's device. The deficiencies of present day manufacturing techniques are partially due to the extremely large number of interconnections required for large scale pixel arrays. In Kramer's preferred embodiment, the 256×256 format requires 65,536 individual interconnects between the detector and read-out arrays. The number of interconnects significantly increases as the size of the array increases.

The patent to Antonuk discloses a thin film, flat panel, pixelated detector array serving as a real-time digital imager for digital imaging of ionizing radiation. Antonuk's device includes an array of sensors and thin film field effect transistors mounted upon a glass substrate. For megavoltage beams, a photon to electron conversion layer may be, optionally, located directly above and in contact with a phosphor or scintillating layer. Each sensor constitutes a p-i-n photodiode which is connected to the source contact of a corresponding thin film field effect transistor via a lower electrode layer integrally formed with the source contact. The photodiode sensors are each formed from an intrinsic Si:H layer which is at least 0.1 microns thick and may be up to 3 microns or more thick. Below the intrinsic layer is provided a P+ doped layer upon a lower electrode which is provided upon the glass substrate. Above the intrinsic layer is provided an N+ doped layer which is approximately 100 angstroms thick. The N+ layer lies below an upper electrode which is made of a material transparent to visible light. Optionally, a phosphor or scintillating layer may be located directly upon the transparent upper electrode.

However, the foregoing device proposed by Antonuk has met with limited success. In particular, Antonuk's device at best only affords detection for 50% of the surface area of the detector array. Each sensor is provided immediately adjacent and connected to its corresponding field effect transistor (FET). Each FET and its corresponding sensor diode are of similar dimensions and thus the sensor diodes are separated within the array by distances approximately equaling the width of each sensor diode. Consequently, approximately half of the surface area of Antonuk's detector array includes sensor diodes and the remaining half is composed of field effect transistors. This configuration limits the resolution of the detector array's coverage area. Further, Antonuk detector array necessitates a very complicated read-out technique utilizing a large number of transistors (i.e., one transistor per sensor diode).

Hence, a need remains for an improved detection and imaging system for high resolution biomedical applications. It is an object of the present invention to meet this need.

SUMMARY OF THE INVENTION

It is an object of the present invention to provide a high resolution biomedical imaging system which directly detects x-rays.

It is another object of the present invention to provide a high resolution biomedical imaging system with improved spacial and energy resolution through the use of a CCD device which directly detects x-rays passing through examined tissue.

It is a further object of the present invention to provide a high resolution biomedical imaging system which minimizes the dosage of x-rays per test in order to reduce the dangers of routine screening and to enable more frequent testing.

It is yet a further object of the present invention to provide a high resolution biomedical imaging system which reduces smearing, distortion and glare and improves spacial resolution within the imaging system while enabling real-time examination of diagnostic images.

It is a further object of the present invention to provide a high resolution biomedical imaging system which affords direct detection of x-rays emitted from biological samples.

It is a further corollary object of the present invention to provide a CCD which directly detects x-rays emitted from a biological sample that includes radioactive isotopes that are cloned to the biological sample as tracers, in order to determine presence and location of the tracers.

An imaging system is provided for direct detection of x-rays which are transmitted through, or emitted from, a biological tissue. According to a first embodiment, in which x-rays are transmitted through a biological sample, the imaging system includes an energy source for emitting x-rays along an irradiation path toward the biological tissue. A charge coupled devices (CCD) is located proximate to and on a side opposed to the radiation source of the biological tissue. The CCD is arranged transverse to the irradiation path. The CCD directly receives and detects the x-rays after passing through the biological tissue. The CCD is functionally divided into storage cells, each of which individually stores an electrical count representative of a number of x-rays directly detected by the cell. The imaging system further includes a pattern generator electrically coupled to the CCD for reading a stored count from at least a subset of cells. The cells of the CCD are divided into rows and columns. The pattern generator reads the stored count from each cell by electronically driving the columns of cells to shift the stored count from each column to at least one outer row of cells. Each stored count is then loaded into a serial shift register for conversion to digital count data and delivery to an image processor. A display device is provided for displaying an image representative of the count data processed by the image processor.

In an alternative embodiment, radioactive isotopes are cloned to biological samples as tracers. The samples are exposed in close proximity to the CCD which directly detects x-rays emitted from the radioactive isotopes. As in the first embodiment, the cells of the CCD store counts representative of the number of directly detected x-rays emitted from the sample. The pattern generator reads the counts from each cell and the display device displays an image representative of the count data processed by the image processor.

BRIEF DESCRIPTION OF THE DRAWINGS

FIG. 4 illustrates a detailed block diagram of a biomedical imaging system according to the preferred embodiment of the present invention.

FIG. 5a illustrates four exemplary read-out techniques when directing analog count data to one read-out corner of the CCD by which x-ray counts may be read from a charge coupled device utilized in a biomedical imaging system according to the preferred embodiment of the present invention.

FIG. 5b illustrates six exemplary read-out techniques when directing analog count data to two read-out corners of the CCD of a biomedical imaging system according to the preferred embodiment of the present invention.

FIG. 5c illustrates an exemplary read-out technique whereby stored counts may be directed to the four read-out corners of the CCD utilized according to the preferred embodiment of the present invention.

DETAILED DESCRIPTION OF THE PREFERRED EMBODIMENT

Figure 1:
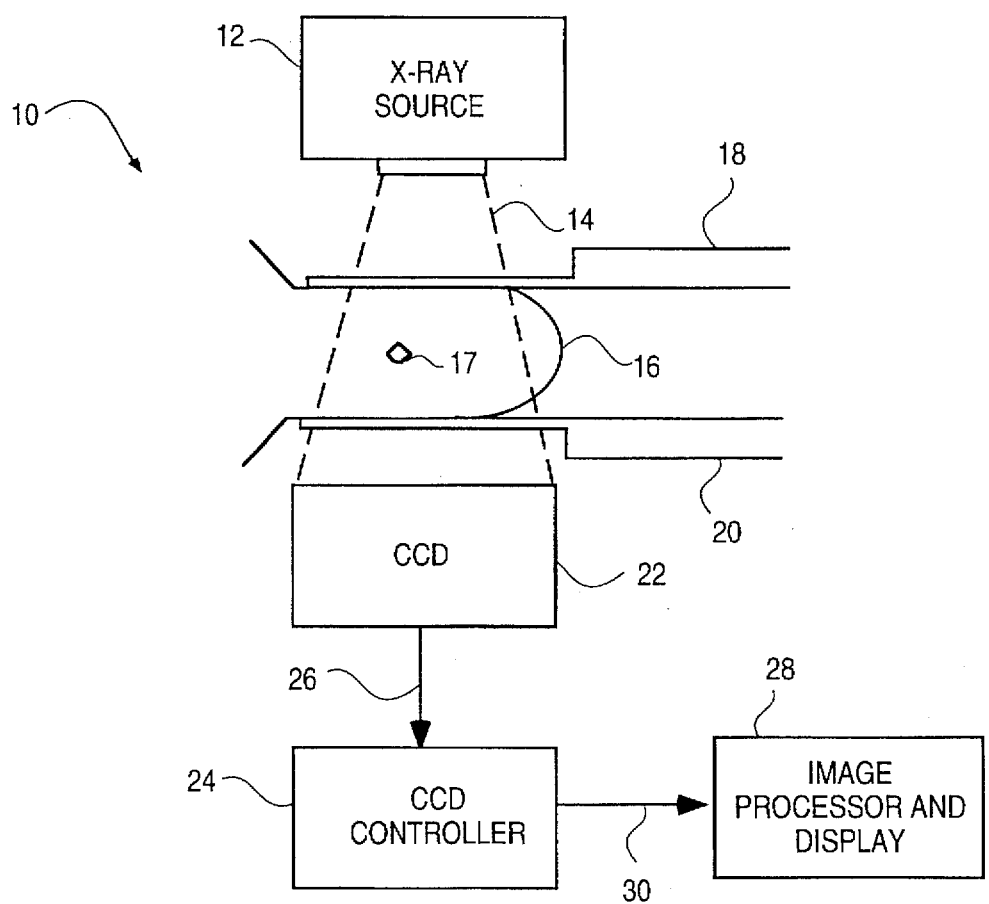
FIG. 1 generally illustrates a block diagram of a biomedical imaging system according to the preferred embodiment of the present invention.

FIG. 1 generally illustrates a biomedical imaging system generated denoted by the reference numeral 10. The system 10 includes an x-ray source 12 for directing x-rays 14 along a predefined path onto a predefined region of a biological tissue 16 to be tested and analyzed for tumors 17 and the like. The biological tissue 16 may represent a human breast when utilized in a mammography application. The biological tissue 16 may be secured at a desired position and orientation through support arms 18 and 20. A charge coupled device (CCD) 22 is located immediately adjacent the biological tissue 16 and in close proximity to support arm 20. The CCD 22 is arranged normal to the trajectory axis of the x-rays 14. The CCD 22 directly receives x-rays 14 which pass through the tissue 16 without any intermediate conversion layer which may deflect, smear, scatter or otherwise interfere with travel of the x-rays.

Upon completion of an irradiation operation, the CCD 22 provides x-ray detection data to a CCD controller 24 via line 26 for analysis and processing. Thereafter, the CCD controller 24 passes the data to an image processor and display 28 via line 30 to generate a visual representation of the image detected by the CCD 22. The visual image may be displayed on a CRT, printed on paper and the like.

Figure 2:
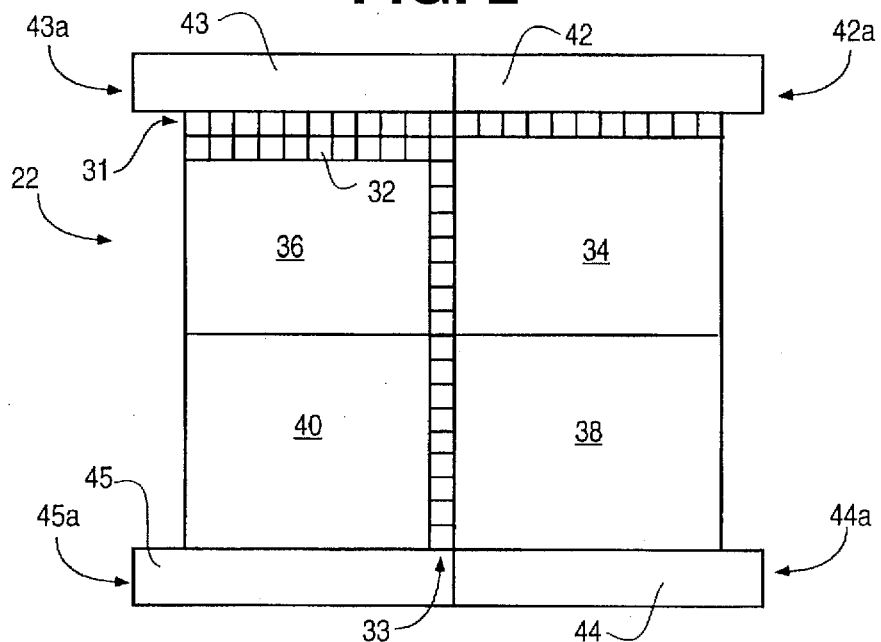
FIG. 2 illustrates a top plan view of a charge coupled device utilized in connection with the preferred embodiment of the present invention.

FIG. 2 illustrates a top plan view of the CCD 22 (FIG. 1). The CCD 22 may be functionally divided into a plurality of individual cells 32 arranged in rows 31 and columns 33. As explained below, each cell 32 stores, temporarily, an electrical signal as a count representative of the number of x-rays incident upon and detected by the cell during an irradiation process. Upon completion of an irradiation process, the count in the cells are read out and utilized as a basis to generate a visual image representative of the x-ray energy distribution detected by the CCD 22.

Optionally, groups of cells 32 may be functionally partitioned into quadrants, such as the four quadrants 34, 36, 38 and 40 illustrated in FIG. 2. Optionally, the top and bottom of the CCD 22 may be electrically interconnected with output registers 42–45 for downloading the electrical counts stored in cells 32. In the example of FIG. 2, the cells 32 in quadrant 34 are connected to right top register 42, while the cells in quadrant 36 are connected to left top register 43. Similarly the cells in quadrants 38 and 40 are connected to right and left bottom registers 44 and 45, respectively. Each of registers 42–45 may separately store an analog count for the last cell within each column. Thus, if each quadrant 34, 36, 38 and 40 includes 500 columns of cells, each register may separately store 500 analog counts. The counts are serially shifted to either end of the register.

Figure 3:
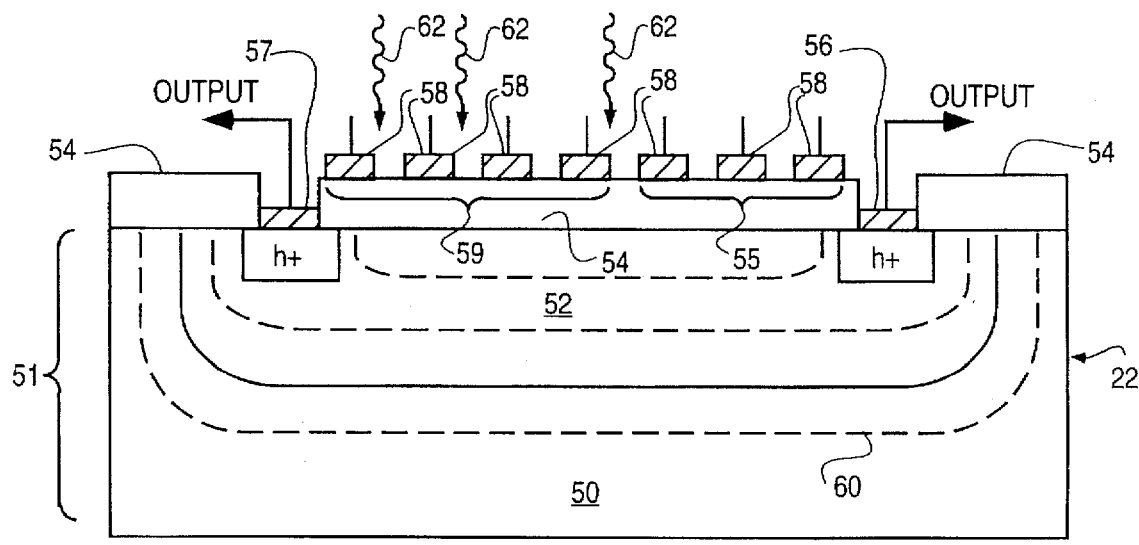
FIG. 3 illustrates a side sectional view of a charge coupled device for use in a biomedical imaging system according to the preferred embodiment of the present invention.

FIG. 3 illustrates the structure of an exemplary buried channel charge coupled device which may be utilized in connection with the preferred embodiment of the present invention. In the exemplary buried channel CCD, a p-type substraight 50 is utilized with an n-type buried channel 52. A silicon oxide layer 54 is provided on top of the p-type substrate. Output electrodes 56 and 57 are provided in gaps in the silicon oxide layer 54 and transfer electrodes 58 are provided on the silicon oxide layer 54. Electrical potentials are applied selectively to electrodes 58 to define cells 32 within the channel 52. As explained below, the electrodes 58 are selectively biased to shift stored electrical counts between cells 32 within the n-type buried channel 52 to the output electrodes 56 and 57. Thus, in the example of FIG. 3, electrode 56 may receive counts shifted along the column of cells denoted by bracket 55, while electrode 57 may receive counts shifted along the column of cells denoted by bracket 59. By way of example only, electrode 56 may connect with, and supply analog count data to, top register 42. Electrode 57 may connect with, and supply analog count data to, bottom register 44. Dashed line 60 is representative of the depletion layer boundary. X-rays 62 may be received along the entire upper surface of the CCD. The electrodes 58 permit x-rays to pass therethrough in order that the entire upper surface of the complete CCD is sensitive to x-rays.

For a more detailed understanding of the operation of charge coupled devices, generally, reference is made to a book by Edward S. Yang entitled "Fundamentals of Semiconductor Devices", published by McGraw Hill Company, 1978, which is hereby expressly incorporated in its entirety by reference.

During operation, electrical potentials are applied to selected electrodes 58 to produce corresponding cells 32 in the channel 52 proximate the electrode 58. The cells 32 represent potential wells for storing electron-hole pairs representative of a count of x-rays detected by the cell 32. As x-rays are received within each cell of the CCD, the energy of the x-ray is absorbed to provide an electron hole pair within the corresponding cell. The number of electron hole pairs within a cell is proportional to the number of incident, detected x-rays. Thus, as more x-rays are incident upon a particular cell, the cell collects a higher number of electron hole pairs. Ultimately, the electron hole pairs are read from the CCD 22 and visually presented to the user as an image. The light intensity of each region of the image corresponds to the count in a related cell in the CCD 22.

A small percentage of the x-rays 62 pass completely through the CCD 22 without being converted to electrons. The x-rays which pass through the CCD are not detected. The conversion efficiency of the CCD 22 refers to the percentage of incident x-rays 62 which are converted to electrons and thus detected by the CCD. The conversion efficiency of the CCD 22 is proportional to the thickness 51 (FIG. 3) of the CCD 22. The conversion efficiency increases as the CCD 22 thickness increases. Preferably, the CCD 22 is formed with a thickness of between 30 and 500 microns, and optimally between 60 and 300 microns. By way of example, a CCD having a thickness of 60 microns may provide 5% energy resolution for x-ray energies of 6 KeV, and 3% energy resolution for x-ray energies of 18 KeV. Energy resolutions of 3% and 5% afford sufficient resolution to discriminate scattered and diffused x-rays that would otherwise blur a mammographical image. The conversion efficiency is 65% for the CCD of the preferred embodiment which is 60 microns thick. By way of example only, the CCD 22 may include a 2,048 by 2,048 matrix of cells 32 of 24×24 microns in size. A CCD of 250 micron thickness may be used to provide a 2% energy resolution by direct conversion of 25 KeV x-rays. This allows for background subtraction to correct for Compton scatterings. At these energies, Compton scattering is comparable to total absorption of x-rays.

The CCD 22 of the present invention is provided with a large dynamic range for energy storage in order that each cell may detect and count a large number of x-rays by storing a proportionally large number of electron hole pairs without saturating the cells. By affording the CCD with a large dynamic range, the inventive system enhances the contrast of detection between cells. The processor 24 drives the CCD 22 to read out the counts in a variety of serial and parallel manners.

Figure 6:
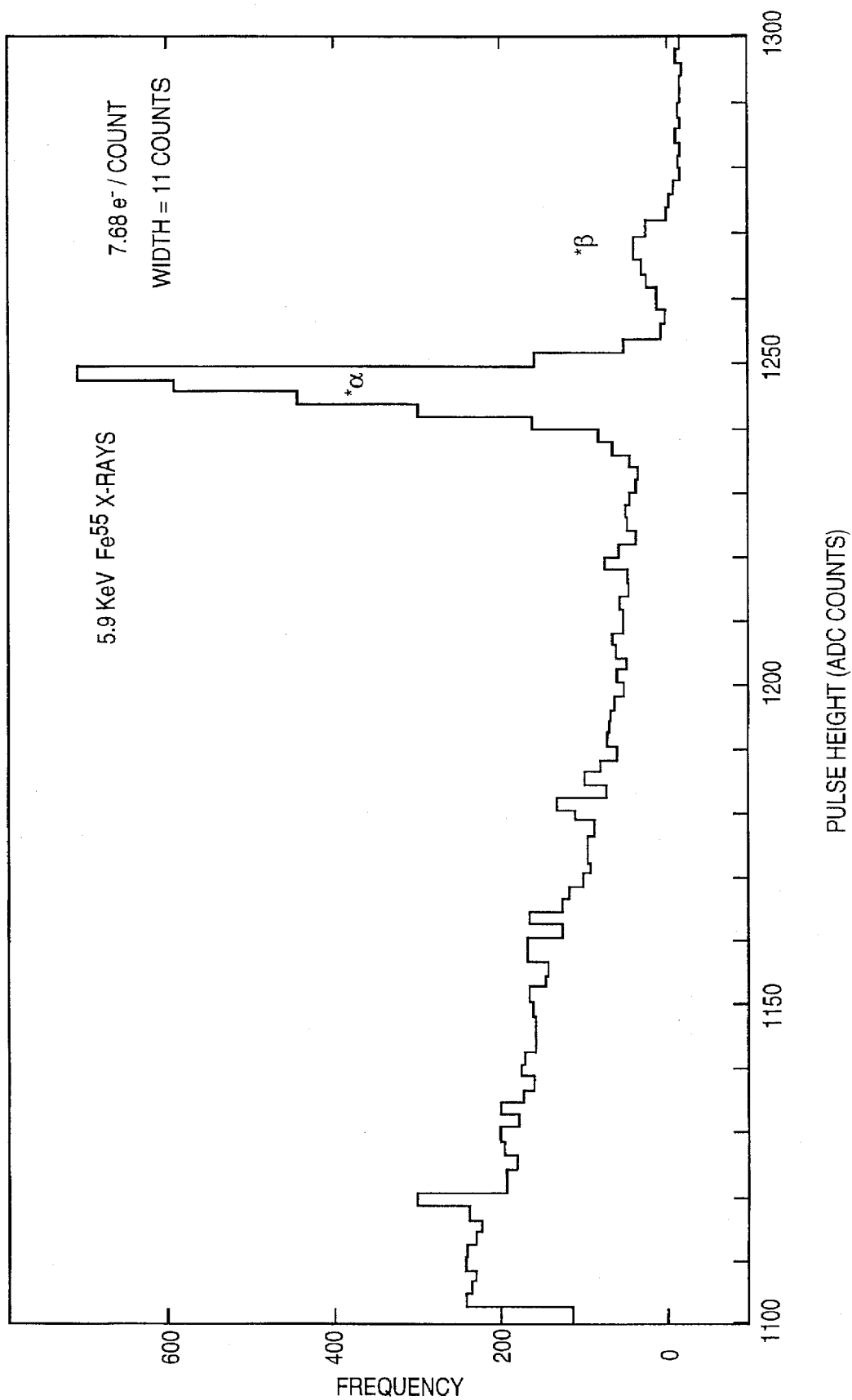
FIG. 6, illustrates a graph of a pulse height spectrum of x-rays as measured by a CCD utilized according to the preferred embodiment of the present invention.

FIG. 6 illustrates a pulse height spectrum of 5.9 KeV Fe$^{55}$ x-rays as measured by the CCD of the preferred embodiment. Each count corresponds to 7.68 electrons measured by the CCD. The half-width of the peak is approximately 11 counts, which corresponds to an energy resolution of 5%.

With reference to FIGS. 5a–5c, the counts within each column of cells may be shifted up or down within the CCD to a corresponding output register 42–45. Counts within each register 42–45 may be moved in the same direction or in opposite directions.

In the preferred embodiment, two top serial registers 42 and 43 and two bottom serial registers 44 and 45 are provided. The registers 42–45 are controlled independent of one another. The adjacent serial registers 42 and 43 at the top of the CCD are electronically connected and may function as a single long serial register in order to transfer all counts to one of ends 42a and 43a. Similarly, adjacent registers 44 and 45 at the bottom of the CCD are electronically connected and may function as a single register in order to transfer all counts to one of ends 44a and 45a. Each of the four registers 42–45 may be connected to separate output amplifiers.

As illustrated in FIGS. 5a–5c, counts may be read from the CCD in several manners. Beginning with FIG. 5a, all counts may be read to a single corner of the CCD 32. To do so, each column of cells may shift corresponding counts upward to the top serial registers 42 and 43. After a column of cells 32 is transferred to the registers 42 and 43, the data counts in the registers 42 and 43 are serially passed to the left or right end of the top registers 42 and 43. Alternatively, the counts within each column of cells may be shifted to the bottom registers 44 and 45. After each column of cells is transferred to registers 44 and 45 the associated data counts are serially shifted to a single read-out corner of one of registers 44 and 45.

FIG. 5b illustrates an alternative read-out technique in which data counts are read from two corners of the CCD. For instance, the counts within each column of cells may be shifted to the top registers 42 and 43. Data counts shifted to register 42 are serially shifted to corner 42a. Data counts shifted to register 43 are serially shifted to corner 43a. Alternatively, the counts may be shifted to the bottom registers 44 and 45 and to opposite ends 44a and 45a. As further options, counts within the cells in quadrants 34 and 36 may be shifted to the upper registers 42 and 43 and serially passed to the corner of one of registers 42 and 43. The counts within cells in quadrants 38 and 40 may be shifted downward to the bottom registers 44 and 45 and serially transferred to the outer corner of one of registers 44 and 45. Turning to FIG. 5c, four read-out corners 42a, 43a, 44a, and 45a may be utilized such that quadrants 34, 36, 38 and 40 shift corresponding counts to registers 42–45.

Figure 10:
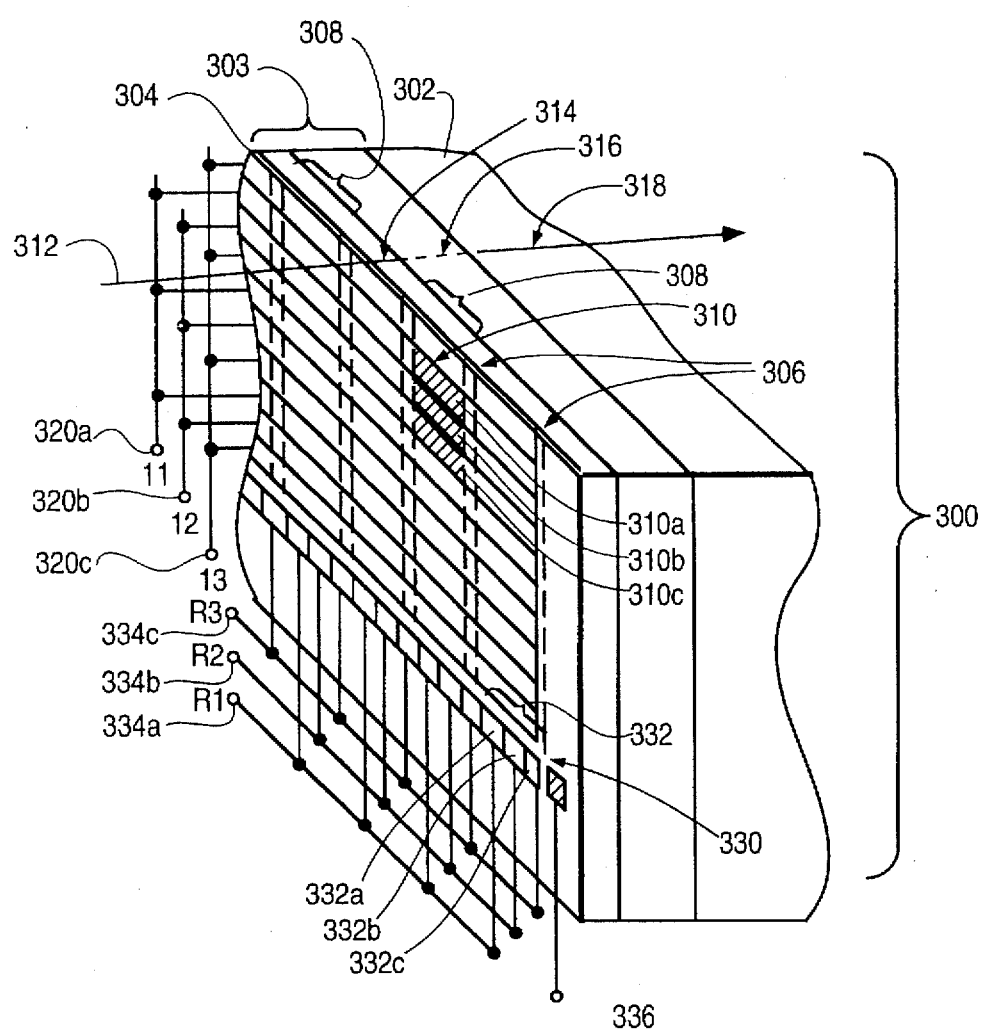
FIG. 10 illustrates a perspective view of one corner of a CCD enlarged to show details of the pixel/cell structure which may be utilized in accordance with an alternative embodiment of the present invention.

FIG. 10 illustrates a perspective view of an exemplary corner of a CCD which may be utilized in connection with an alternative embodiment of the present invention. The CCD 300 includes a p-type substrate 302 with an epitaxial p-type silicon layer 303 thereon. An n-type dopant layer 304 is provided within the silicon layer 303. P-type channel stops 306 are provided to define separate columns 308 of cells 310.

Particle track 312 illustrates the path along which an exemplary x-ray travels when passed through, or emitted from, a biological sample. The particle track 312 passes through regions 314, 316, and 318 of the CCD 300. The region 314 is preferably 30–500 microns thick, and optimally 60–300 microns thick. As x-rays enter the CCD 300, a portion of the x-rays are detected (e.g., converted to electron hole pairs and stored). Regions 314–318 afford differing amounts of electron collection. More specifically, a cell collects (i.e., stores) substantially all of the electron hole pairs produced in region 314. Thus, when an x-ray produces electron(s) in region 314, substantially all of these electrons are stored in the cell as the count. A cell partially collects (i.e., stores) electrons produced in region 316. Thus, when an x-ray produces electron(s) in region 316, only a portion of these electrons are ultimately stored by the cell. A substantial majority of electron hole pairs produced in region 318 are not stored by the cell, but instead are recombined. Thus, x-rays which produce electrons in region 318 are not detected (i.e., associated electrons are not stored in the cell).

The CCD 300 enhances the detection of x-rays (i.e., conversion of x-rays to electrons and storage of electrons) by increasing the thickness of regions 314 and 316. As explained above, by increasing these thickness, the CCD 300 becomes more efficient and detects a higher percentage of the incident x-rays.

With continued reference to FIG. 10, diagonally hashed lines define a cell 310. By way of example only, each cell may be divided into three subsections 310a, 310b and 310c, each of which is separate controlled by one of cell control lines 320a, 320b, and 320c, respectively. Optionally, different biasing voltages may be applied to cell control lines 320a–320c to define a potential well for storage of electron counts. For instance, during detection, control line 320b may have a higher biasing voltage than control lines 320a and 320c to produce a deeper potential well below subdivision 310b than below subdivisions 310a and 310c of cell 310. As x-rays produce electrons within regions 314 and 316 of the subdivisions 310a–310c, the electrons flow to the deeper potential well below subdivision 310b to be stored until read from the CCD 300.

During a read out operation in which counts are shifted down, the biasing voltages applied to cell control lines 320a–320c are cyclically varied such that the electrons stored in a potential well at subdivision 310b are shifted to a newly created potential well at subdivision 310c. The electrons are thereafter shifted down to the uppermost subdivision of the next lower cell. Similarly, a count of electrons stored in the upper cell adjacent to cell 300 is shifted to a potential well created below subdivision 310a and thereafter to potential wells created below subdivisions 310b and 310c. In this manner, the cell control lines 320a–320c shift electron counts downward to shift register 330. Register 330 includes multiple gates 332 divided into output gate subdivisions 332a–332c. The output gate subdivisions 332a–332c are separately controlled by output gate control lines 334a–334c, respectively. The output gate control lines 334a–334c are controlled in a cyclical manner similar to that described above in connection with the cell control lines 320a–320c. The output gate control lines 334a–334c control the shift of electron counts laterally to one end of the register 330 and to an output amplifier at lead 336 for further processing and display.

Figure 11:
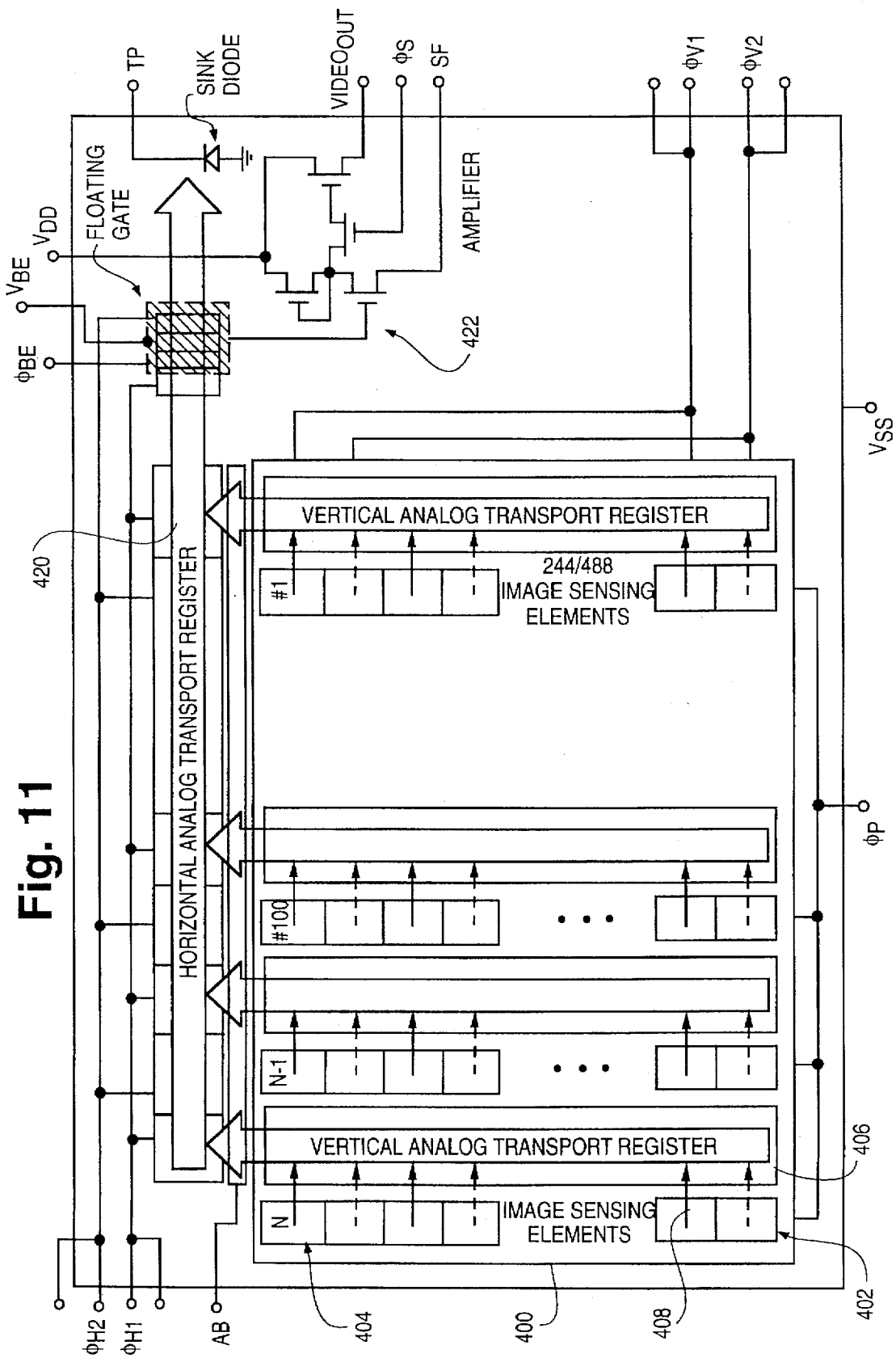
FIG. 11 illustrates a block diagram of a top plan view of a CCD which may be utilized in accordance with an alternative embodiment of the present invention.

FIG. 11 illustrates a block diagram of a CCD of an alternative embodiment. The CCD 400 of FIG. 11 is configured to include columns 402 and 406 of cells or pixels 404. Multiple columns may be configured to operate as vertical analog transport registers 406, in which cells receive counts from adjacent cells 404 (as indicated by arrow 408). Optionally, every other column 402 may be defined as a vertical analog transport register 406. Cells in registers 406 and columns 402 both detect x-rays and store electron counts.

During a read out operation, the cells in registers 406 operate initially operates to shift counts contained therein upward to horizontal analog transport register 420. Optionally, the count in the upper most cell of each of transport registers 406 is shifted first into register 420, after which the counts are shifted horizontally to a floating gate and output amplifier 422. Thereafter, the next row of cells in the registers 406 are shifted up and out to register 420. Once all of the counts in registers 406 are shifted up and out, the counts in adjacent columns 402 are laterally shifted in the direction of arrow 408 into the cells in registers 406. Then the above shifting process is repeated.

Optionally, the counts in the cells of columns 402 may be combined (i.e., summed) with the counts in the cells of registers 406 (this process is referred to as "binning").

Turning to FIG. 4, the CCD processor 24 is illustrated in more detail. The CCD processor 24 includes a CCD controller 100, a camera interface 102, a multi-channel signal processing board 104 and a DEWAR module 106. The CCD controller 100 sets the CCD control timing patterns and voltage levels. The CCD controller 100 also controls the CCD operating temperature and monitors the various voltage levels of the camera electronics. The camera interface 102 includes a processor 108 which remotely controls the CCD controller 100. The camera interface 102 further includes memory containing RAM 110, and EEPROM 112 and PROM 114. The PROM 114 stores the processor boot, reset and control routines. The PROM 114 further stores camera operating parameters.

The CCD controller 100 includes a line shifter 117, a pattern generator 118 and a CCD level setting digital-to-analog-converter (DAC) 116. The pattern generator 118 communicates with the DEWAR module 106 via line 124. The CCD level setting DAC 116 communicates with the DEWAR module 106 via line 122. The line shifter 117, pattern generator 118 and CCD level setting DAC 116 cooperate to control the CCD 22 through a CCD driver 126 via lines 122 and 124. The processor 108 communicates with the line shifter 117, pattern generator 118 and the CCD level setting DAC 116 via bus 120. While not illustrated, it is understood that each interconnecting line illustrated in the figures is merely representative and may include multiple data/address lines.

The DEWAR module 106 includes the CCD 22, a CCD driver 126, and a pair of two channel amplifiers 128 and 130. The CCD driver 126 is connected with the transfer electrodes 58 (FIG. 3) and drives same to create cells within the CCD and to shift counts between cells according to a sequence received from the pattern generator 118. The register output lines 42b–45b are connected with amplifiers 128 and 130. Amplifiers 128 and 130 receive analog signals from the serial registers 42–45 representative of the counts stored in the cells. The amplified analog signals are supplied via lines 133 and 135 to analog-to-digital converters (ADC) 132 and 134, respectively. The ADCs 132 and 134 digitize received input analog signals and output digital signals corresponding to the counts from cells of the CCD 22. The digitized signals are output upon lines 137 and 139 to an interface 136. The digital signals are ultimately transferred to a remote display device for storage, additional image processing, display and the like. The interface 136 controls the transfer rate from a/d converters 132 and 134 via control lines 138. Once, the counts are digitized, the digital samples are output to an interface 136 and relayed to an image processing apparatus.

The pattern generator 118 selectively controls the amplifiers 128 and 130 to output the analog signals from each register 42–45. Selective control by the pattern generator 118 allows for the count stored in each individual cell to be separately output or, alternatively, to be "binned". Binning refers to a summing operation in which counts from multiple cells in a single column and/or row are combined prior to output from the CCD. By way of example, subsections of cells (e.g., 5 by 5 sections) may be counted together by shifting counts from multiple cells (e.g., 5) in a column into a single cell. The count sum in the single row of cells may be combined into a sum for one or more adjacent cells (e.g., 5). The binning operation enables variation in the level of sample courseness or resolution by separately or collectively processing cells. It may be desirable to use binning techniques in areas of the CCD corresponding to image areas of less interest (e.g., borders, predetermined regions and the like).

Upon power-up, the processor 108 loads a set of operating parameters from PROM 114 into RAM 110. Thereafter, the processor 108 loads these parameters into the appropriate registers in the line shifter 117, pattern generator 118, and level setting DAC 116. Optionally, a control port (not shown) may afford the ability to modify the program parameters. When program parameters are modified, such changes are subsequently relayed to the associated registers in the line shifter 117, pattern generator 118 and level setting DAC 116. The modified parameters may also be stored in the EEPROM 112 for future recall.

The pattern generator 118 generates a pattern of signals delivered along line 124 to the CCD driver 126 to control CCD 22 accordingly. The pattern generator 118 may afford multiple modes of operation for the CCD, including but not limited to a drift-scan or point-and-shoot mode, a multipinned phase or non-multipin phase mode, course or fine parallel binning mode, parallel row binning, serial pixel binning, subsection or full CCD read-out a test mode, a FAST CLEAR mode, and 1–4 corner read-out modes. The line shifter 117 controls the parallel column/row shift rate of the CCD. The line shifter 117 sends pulses to the pattern generator 118 at appropriate times to drive the cells of the CCD to shift each parallel column of counts into the desired serial register. The line shifter 117 delivers to the pattern generator 118 a logical level "fast/slow" signal which instructs the pattern generator 118 when one or more cells of charge in the serial register is to be cleared or digitized. The "fast" logic level instructs the pattern generator 118 to shift a count of pixels out of the serial register without digitizing the count. The "slow" logic level instructs the pattern generator 118 to shift the count from a cell out of the serial register and digitize the count associated with the cell for storage in memory and display.

Figure 7:
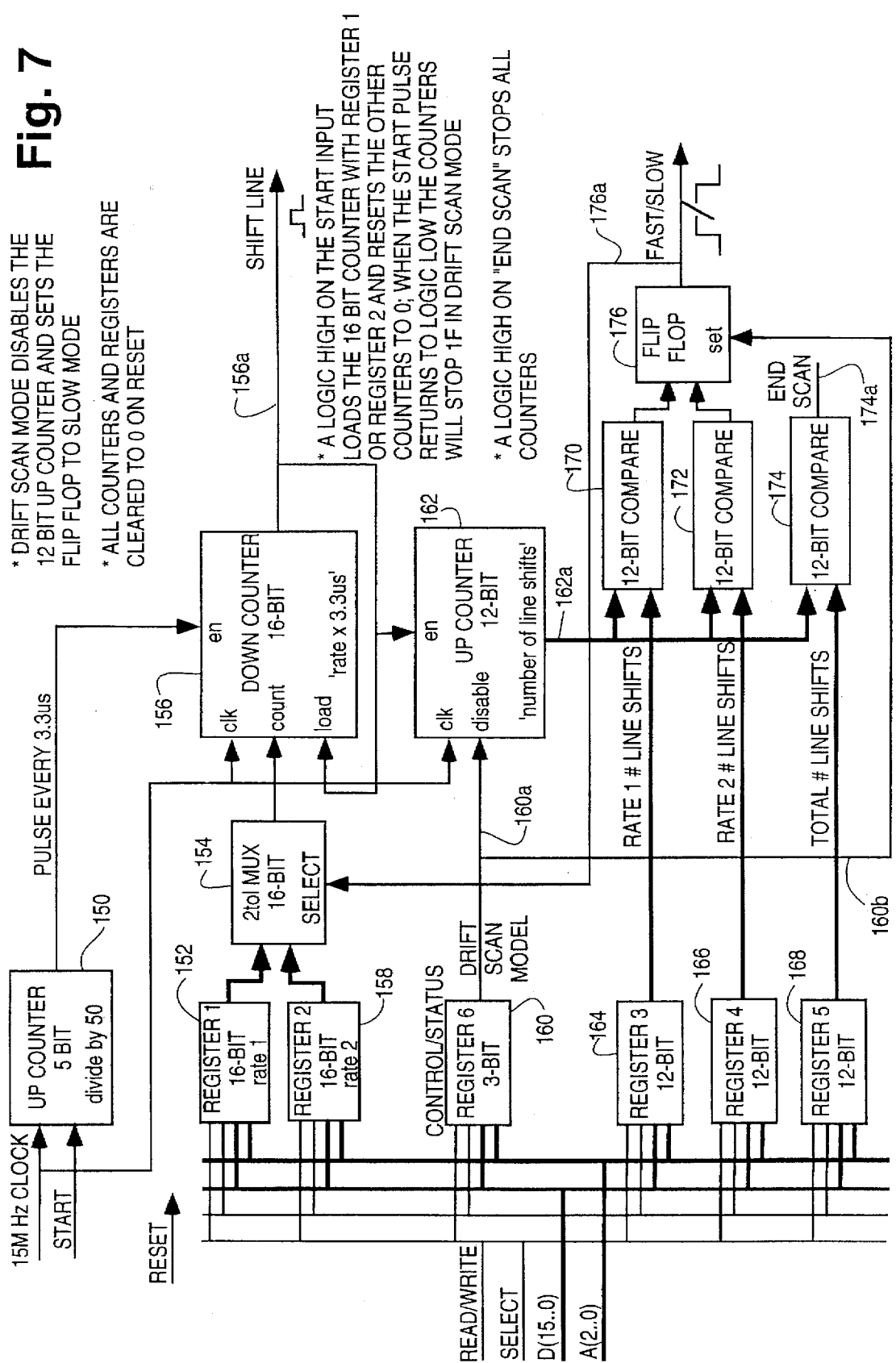
FIG. 7 illustrates a detailed block diagram of the line shifter of the preferred embodiment of the present invention.

FIG. 7 illustrates the line shifter 117 in more detail. The line shifter 117 includes first and second rate registers 152 and 158, a control/status register 160, and reference registers 164, 166 and 168. The rate registers 152 and 158 communicate with a multiplexor 154 which delivers its output to a downcounter 156. Upcounters 150 and 162 are also provided. The outputs of registers 164, 166 and 168 and of the upcounter 162 are delivered to comparitors 170, 172 and 174. The outputs of comparitors 170 and 172 are supplied to a flip-flop 176 which outputs a fast/slow control signal 176a. The downcounter 156 outputs a line shift control signal 156a.

During operation, the line shifter 117 may operate in a drift-scan mode or a point-and-shoot mode. The drift-scan mode is described first hereafter. In the drift-scan mode, the processor 108 sets bit zero of the control/status register 160 to a logical high state. Responsive thereto, the output of register 160 disables the upcounter 162 via line 160a. The output of the register 160 is also supplied along line 160b to flip-flop 176 to set the flip-flop, such that the output thereof is in a slow state. The slow state output of flip-flop 176 is delivered along line 176a to multiplexor 154. Responsive to line 176a, the multiplexor 154 selects the output of register 158 as the line shift rate which is loaded into the downcounter 156. When the START input is driven to a high level by the processor 108, the upcounter 150 and the downcounter 156 operate to produce a pulsed signal at the shift line output (line 156a). The pulse rate of the shift line signal is set by the value in register 158 (e.g., a rate of 3.3 microseconds times the value stored in register 158). The shift line pulses occur at the selected rate until the START input returns to a logical low level. The fast/slow output is held to a logical low level when the line shifter 118 is in the drift-scan mode.

Next, the line shifter is explained in connection with the point-and-shoot mode. When the START input is driven to a logical high level by the processor 108, the fast/slow output goes to a logical high level which is delivered along line 176a to the multiplexor 154. In response thereto, the multiplexor 154 selects the rate stored in register 152 and delivers same to the downcounter 156.

When the START input is driven to a logical high level, the control/status register 160 remains at a level representative of the point-and-shoot mode. The point-and-shoot mode signal is delivered along lines 160a and 160b to the upcounter 162 and the flip-flop 176.

When the fast/slow output is set to a logical high level, the counters begin to operate to output shift line pulses. The rate at which the shift line pulses occurs is set by the value in rate register 152. The shift line pulses are also used to increment the upcounter 162 which outputs, along line 162a, a signal representative of the number of line (i.e., column) shifts which have occurred. When the number of line shifts equals the value in register 164, the comparitor 170 directs the flip-flop 176 to toggle. When the flip-flop 176 changes states, line 176a goes to a "slow" mode. Responsive thereto, multiplexor 154 delivers the rate stored in registered 158 to the downcounter 156. The upcounter 162 continues to count the number of lines shifted with each shift line pulse until the count on line 162a equals the value stored in register 166. Thereafter, comparitor 172 directs flip-flop 176 to toggle again returning the output line 176a to the fast mode. The counter 162 continues to count the number of line shifts (column shifts) until it equals the value in register 168 at which time the counters are disabled by comparitor 174 which outputs an end scan command upon line 174a. During normal operation, the START input will return to a logical low level before the line counter reaches the value in register 168.

Registers 152, 158, 160, 164, 166 and 168 are loaded by the processor 108 to determine the line shifting rate of the CCD. Rate register 152 stores a value which determines the period between shift line pulses when in the point-and-shoot mode, fast shift rate. The slow rate register 158 contains a value that determines the distance between shift line pulses when in the drift-scan mode or the slow shift rate, in the point-and-shoot mode. The control/status register 160 may represent a three bit register which outputs a signal indicating whether the system is operative in a drift-scan mode or in a point-and-shoot mode. When a one is received on the zero input bit line, the control/status register 160 sets the output line to the drift-scan mode. When a zero is written to the zero bit input line, the control/status register 160 sets the line shifter to the point-and-shoot mode. When a one is written to the one bit input line, the register 160 resets the line shifter 117.

Register 164 contains a number which is compared to the value at the output of the upcounter 162. The register 164 is used in the point-and-shoot mode to determine when to switch between fast or slow modes. The number in the register 164 represents the number of lines to be shifted in the fast mode. The register 166 contains a number which is compared to the value of the upcounter 162. The register 166 is used in the point-and-shoot mode to determine when to switch from slow to fast modes. The number in the register 166 minus the number in register 164 represents the number of lines to be shifted while in the slow mode. Register 168 contains a number which is compared to the value at the output of the upcounter 162. The value in the register 168 refers to the total number of parallel rows to be shifted in the point-and-shoot mode. The number in register 168 should be greater than or equal to the number in register 166. When the CCD is operated in a split configuration in which half of the cells are shifted to the top of the CCD and the remaining half are shifted to the bottom of the CCD, the value in register 168 should equal half of the value in the register 164.

According to the foregoing process, the line shifter 118 is controlled to shift counts from the cells in the CCD in selected modes and at differing rates.

Figure 8:
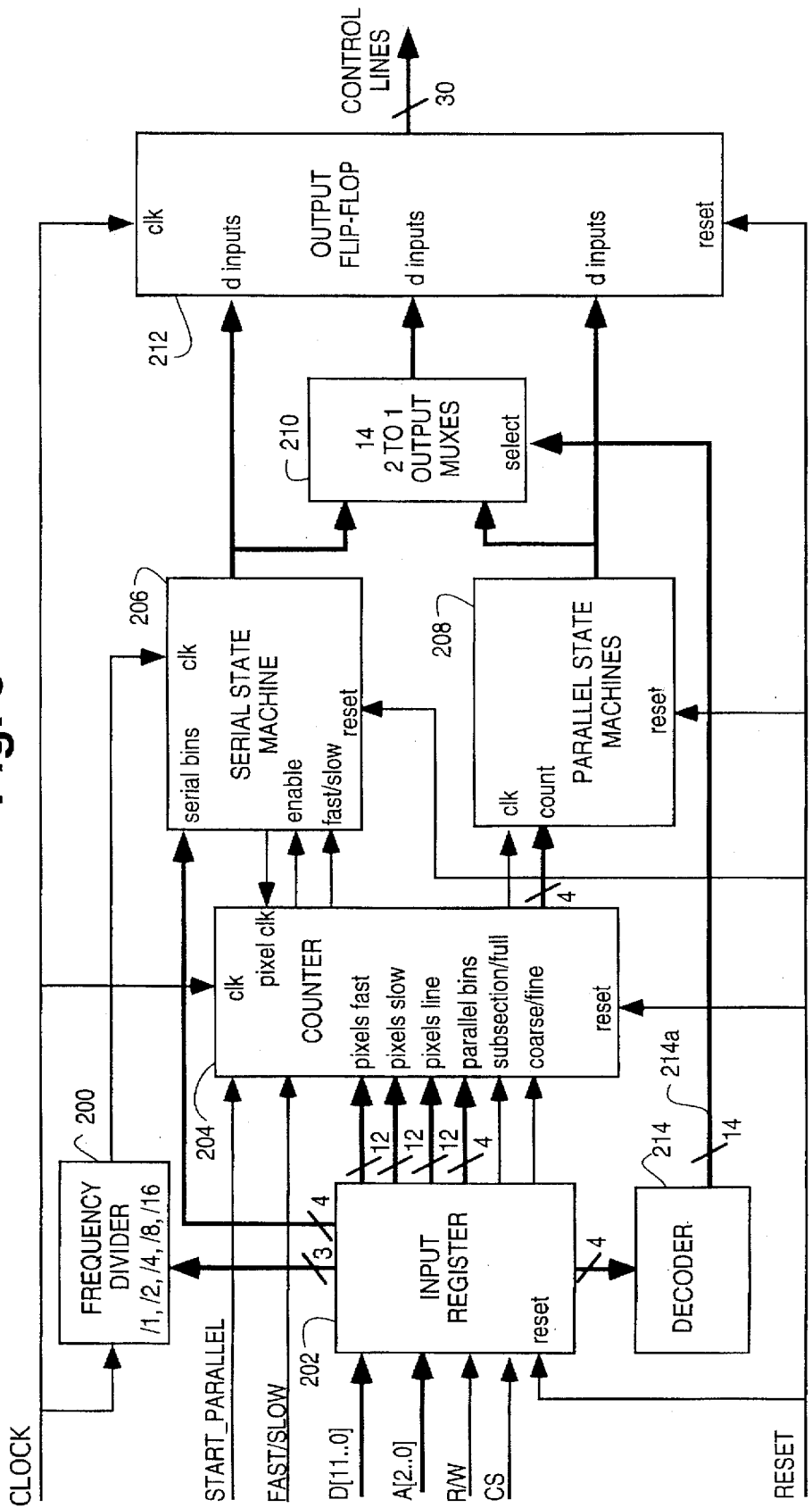
FIG. 8 illustrates a detailed block diagram of the pattern generator of the preferred embodiment of the present invention.

Next reference is turned to FIG. 8 which illustrates the pattern generator 118 in more detail. The pattern generator 118 includes a frequency divider 200 to selectively output a clocking signal having a frequency which is an integer multiple of the input clock frequency. An input register 202 is provided to receive address and data signals, a read-write control signal and a control status (CS) signal. The input register 202 communicates with a decoder 214 and a counter 204. The counter 204 communicates with a serial state machine 206 and a parallel state machine 208. Outputs of the serial and parallel state machines 206 and 208 are delivered to an output multiplexor 210. Output signals of the serial or parallel state machines 206 and 208 and of the multiplexor 210 are delivered to output flip-flops 212.

The decoder 214 controls operation of the multiplexor 210. The decoder 214 deciphers data from the read-write input lines and, based thereon outputs at lines 214a a number as the control inputs of multiplexor 210. The value read by the decoder 214 from the read-write lines (e.g., lines 0–3 of the read-write lines) set the 14 control inputs of the multiplexor 210 to the appropriate logical level for the selected shifting pattern (as illustrated in FIGS. 5a–5c).

Figure 9:
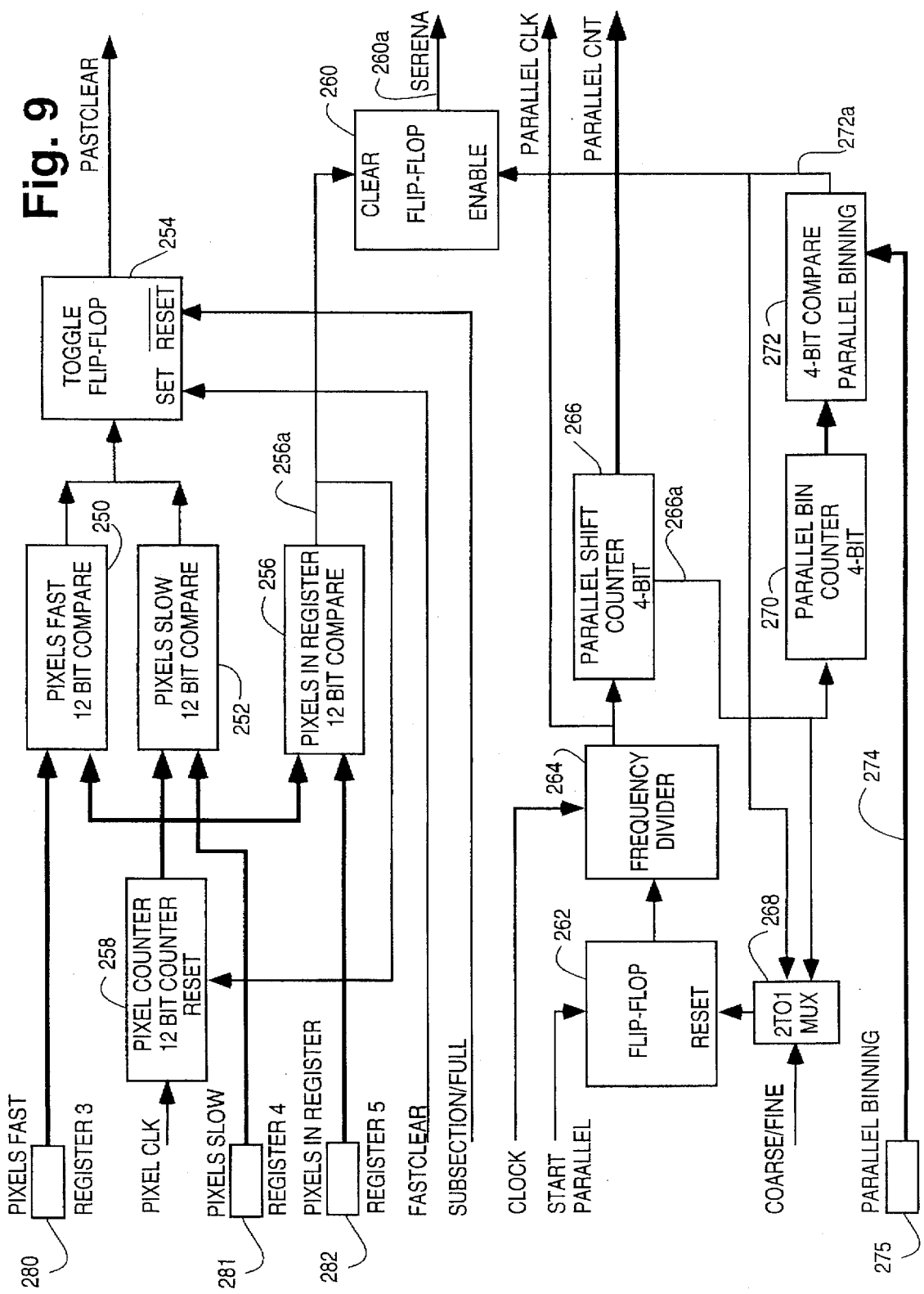
FIG. 9 illustrates a detailed block diagram of the counter circuitry of the preferred embodiment of the present invention.

The counter 204 is illustrated in more detail in FIG. 9. The counter 204 includes a pixel counter 258, a parallel shift counter 266 and a parallel bin counter 270. A parallel column shifting operation begins when a positive going edge is applied to the START PARALLEL input to flip-flop 262. The positive going edge of the START PARALLEL input is used to generate a pulse from the flip-flop which enables a frequency divider 264. The frequency divider 264 outputs a clock frequency based on the incoming clock frequency. The output of the frequency divider 264 is provided as a PARALLEL CLOCK signal delivered to the parallel state machines 208 (as the CLK input in FIG. 8). The output of the frequency divider 264 is also used as a clock signal for the parallel shift counter 266 which counts down from a preloaded predetermined value. When the count reaches zero in the parallel shift counter 266, the carry output at the next clock pulse is delivered along line 266a to the parallel bin counter 270 and to multiplexor 268. If in the fine binning mode (determined by the COURSE/FINE input line to multiplexor 268), the carry signal received along line 266a is delivered to the flip-flop 262 to disable the frequency divider 264.

Alternatively, when the pattern generator 118 is set to the course binning mode, the frequency divider is not disabled by the carry signal along line 266a. Instead, the parallel shift counter 266 again counts down from its preloaded value until it reaches a count of zero at which time it is reset or reloaded to the preloaded value and the count down is repeated. When the parallel shift counter 266 is reset or reloaded, the parallel bin counter 270 is again incremented. The parallel bin counter 270 continuously outputs its present count. This process is continuously repeated until the parallel bin counter 270 outputs a count equal to the value stored in a parallel binning register 275 within the input registers 202. The value stored in the parallel binning register 275 in registers 202 is delivered via line 274 to the comparitor 272. When the inputs on the line 274 and from parallel bin counter 270 equal one another, the comparitor 272 outputs a disabling signal on line 272a which is supplied to the multiplexor 268 and the flip-flop 262 to disable the frequency divider 264. The signal upon line 272a also enables the flip-flop 260 which outputs a SERENA signal to enable the serial state machine 206 (FIG. 8).

The difference between course and fine parallel binning modes is explained hereafter. The term course binning refers to the process whereby parallel rows 31 are shifted into the serial register 42–45 at a predefined first rate, such as one row every 233 microseconds. The term fine binning refers to the process whereby parallel rows 31 are shifted into the serial register 42–45 at a setable rate, the setable rate being between 10 and 110 parallel row per second. The parallel bin counter 270 may represent a four bit counter which controls the parallel row binning process. The parallel bin counter 270 receives its clock pulses from the parallel shift counter 266.

Outputs of the parallel bin counter 270 are compared to the value upon line 274 which is delivered from the input registers 202. When the values compared in comparator 272 are equal, the comparitor 272 sets flip-flop 260 which enables the serial state machine 208 allowing the counts in the serial register 42–45 to be shifted out to the Amps 128 and 130. If the comparative values are not equal, the counter does not enable the serial state machine 206 and the next parallel row of cells is binned (i.e., summed) with the previous parallel row of cells. By way of example only, up to 16 parallel rows may be binned together before the serial state machine is enabled, in order to allow the counts for 16 cells in each column to be summed in the serial registers and then to be shifted out together. The parallel bin counter 270 is reset to zero when the serial state machine 206 is enabled.

The pixel counter 258 may represent a 12-bit counter whose output is compared with the values in pixel/cell registers 280–282 within the input register module 202. The pixel counter 258 operates in one of two ways depending on whether a subsection of the CCD is to be digitized or whether the full CCD is to be digitized. When the pattern generator 118 is in a full mode, the values in registers 280 and 281 within the input register module 202 are irrelevant. The value in register 282 within the input register module 202 is utilized as the number of pixels/cells that are to be shifted to the output amplifier of the CCD array. The pixel counter 258 receives a clock pulse from the serial state machine 206 each time a pixel/cell is shifted out. When the output of the counter 258 equals the value in register 285 within the input register module 202, the output of comparitor of 256 (delivered along line 256a) resets the counter 258. The output of comparitor of 256 also resets the flip-flop 260, thereby disabling the serial state machine 206 via output line 260a.

The pattern generator may be set in a "subsection mode" when only a subsection of the pixels/cells within the CCD are to be read out. When in a subsection mode, the values in registers 280 and 281 in the input register module 202 correspond to the pixel counts at which the serial state machine 206 is to run in the FAST CLEAR mode and in the slow digitizing mode. Register 282 within the input register module 202 operates in the manner explained above in connection with the full mode. The values in the fast and slow registers 280 and 281 are compared in comparitors 250 and 252, respectively, with the output of counter 258. When the output of counter 258 equals the values stored in one of registers 280 and 281, the corresponding output of comparitors 250 and 252 toggles a flip-flop 254. The output flip-flop 254 sets the serial state machine 206 in either a FAST CLEAR or a slow digitizing operation mode. Therefore, when in the subsection mode, the flip-flop 254 is initially set, the serial state machine 206 is in the FAST CLEAR mode and the pixel counter 258 is incremented with each clock it receives from the serial state machine 206. When the pixel counter 258 output equals the value in register 280, the flip-flop 254 toggles, the FAST CLEAR output goes low and the serial state machine 206 goes into a slow digitizing mode.

The pixel counter 258 continues incrementing and, when the output equals the value in register 281, output of comparitor 252 toggles the flip-flop 254 in order to set the serial state machine 206 back to the FAST CLEAR mode. When the output of pixel counter 258 equals the value in register 282, comparitor 256 outputs a signals which resets the pixel/cell counter 258 to zero and also resets flip-flop 260, thereby disabling the serial state machine 206. When the pattern generator is in the subsection mode, the flip-flop 254 sets the serial state machine 206 to a FAST CLEAR or slow digitizing mode can be preset to the fast mode by a logic high on the FAST CLEAR input pin. When the FAST CLEAR input pin is at a logic high, the serial state machine 206 is always in a fast mode.

Returning to FIG. 8, operation of the serial and parallel state machines 206 and 208 is explained hereafter. The serial state machine 206 is enabled by an input from the counter 204 which is generated by flip-flop 260 (FIG. 9). Once enabled, the serial state machine 206 drives the CCD to shift counts along the serial registers 42–45.

The parallel state machine 208, once enabled, drives the CCD to shift counts between cells in each column in a parallel manner to a desired shift register 42–45.

The output multiplexors 210 may include three 2:1 output multiplexors, one for the four serial registers, one for the parallel registers and one for the transfer gates. The multiplexors 210 control the way in which CCD data is shifted. The control lines of the three multiplexor 210 are tied to the decoder outputs which are set to a predetermined logic level determined by register 202 (when in the read-out mode). The inputs of the multiplexors 210 come from the serial and parallel state machines 206 and 208 and the outputs are connected to the inputs of the output flip-flop module 212.

The output flip-flop module 212 includes 25 outputs which are used to synchronize the outputs of the state machines and output multiplexors to a common clock. The flip-flop 212 outputs are used to control the analog switches that select the voltage levels of the CCD gates. The preset and clear inputs of the output flip-flops are tied to appropriate nodes to allow the outputs to be at a determined state upon a pattern generator 118 reset.

According to foregoing structure, the pattern generator controls the CCD 22 via line 124 and CCD drivers 126. Counts within cells 34–40 are shifted along columns in a parallel manner to a desired serial register 42–45. Data within the serial registers 42–45 is then serially shifted to output ends 42a–45a of the registers 42–45 and delivered along lines 42b, 43b, 44b and 45b to corresponding amplifiers 128 and 130. Amplifiers 128 and 130 deliver amplified count signals along lines 133 and 135 to A-D converters 132 and 134, respectively. The outputs of the A-D converters 132 and 134 are delivered to an interface 136 which operates to deliver digital representations of the counts from the cells of the CCD 22 to a display and/or printer and the like.

While the embodiment illustrated in FIG. 1 relates in part to a biomedical application in which biological tissue is examined, the present invention is not limited to this application. Alternatively, the present invention may be used in connection with direct detection of x-rays emitted from radioactive isotopes in biological samples. According to this alternative embodiment, radioactive isotopes may be cloned to biological samples as tracers. Once the sample is cloned with radioactive isotopes, the sample is placed in close proximity to the CCD. The CCD detects x-rays emitted from the radioactive isotopes to locate the presence and position of the tracers.

As explained above, low energy x-rays may be detected by silicon based CCDs. Alternatively, semiconductor materials may be utilized to form the CCD, such as Gallium Arsenic (GaAs), Gallium Nitride (GaN) and the like. CCDs using higher density materials are desirable since they substantially increase the conversion efficiency within the CCD. For instance, CCDs which use GaAs are more than twice as dense as silicon based CCDs, and thus offer a substantial improvement in conversion efficiency.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

We claim:

1. A high resolution biomedical imaging system for direct detection of x-rays from an irradiated biological tissue, said system comprising:

an energy source for emitting x-rays along an irradiation trajectory toward a biological tissue to be tested;

a charge coupled device, located immediately adjacent the biological tissue and aligned traverse to said irradiation trajectory, for directly receiving and detecting said x-rays after said x-rays pass through the biological tissue, wherein said charge coupled device is divided functionally into a matrix of cells for individually storing counts of x-rays directly detected by corresponding cells, said counts representing a detected x-ray energy distribution;

a pattern generator, electrically coupled to at least one end of said charge coupled device, for reading an analog output of said counts representing a detected x-ray energy distribution from a cell at one end of said charge coupled device; and a display device for displaying an image representative of said detected x-ray energy distribution based on said analog outputs of said counts read from said cells.

2. The imaging system of claim 1, wherein said cells are arranged in rows and columns, and wherein said pattern generator reads out rows of said counts by driving columns of said cells to shift said counts in parallel to at least one outer row of cells, and by driving said outer rows of said cells to shift said counts to a register for serially delivering said counts to said display device.

3. The imaging system of claim 1, wherein said charge coupled device has a thickness of at least 60 microns.

4. The imaging system of claim 1, wherein said change coupled device has a thickness of at least 250 microns.

5. The imaging system of claim 1, wherein said charge coupled device includes a matrix of at least 2048×2048 cells, each cell being 24×24 microns in size.

6. The imaging system of claim 1, wherein said charge coupled device has an energy resolution of at least 5% and position resolution of at least 10 microns with an efficiency of approximately 65% for detecting x-rays having an energy of approximately 6 KeV.

7. The imaging system of claim 1, wherein said charge coupled device includes a single semi-conductor substrate layer electrically coupled to said pattern generator.

8. The imaging system of claim 1, wherein said charge coupled device has an energy resolution of at least 3% for x-rays having an energy of approximately 18 KeV.

9. The imaging system of claim 1, wherein said charge coupled device includes clock control lines integrally formed with, and electrically coupled to said pattern generator for inducing a transfer of counts between said cells based on clock signals applied to said control lines by said pattern generator.

10. The imaging system of claim 1, further comprising electrodes on an upper surface of said charge coupled device, said electrodes permitting x-rays to pass therethrough in order that an entire upper surface of said charge coupled device is sensitive to and able to receive x-rays.

11. The imaging system of claim 1, wherein said pattern generator uses said counts from said cells to generate an image representative of an x-ray energy distribution detected by said charge coupled device.

12. The imaging system of claim 1, wherein said pattern generator selectively controls the charge coupled device to output the analog signals from each cell.

13. The imaging system of claim 1, wherein said pattern generator sums counts from multiple cells in a column of said matrix prior to output from said charge coupled device.

14. The imaging system of claim 1, wherein said pattern generator shifts counts from multiple cells in a column into a single cell, said single cell summing counts shifted thereto in order to vary a level of sample courseness or resolution by varying a number of cells in each column that are summed in a single cell.

15. The imaging system of claim 1, wherein said charge coupled device includes, at said upper surface, an epitaxial p-type silicon layer with an n-type dopant layer therein and, at said back surface, a p-type substrate.

16. The imaging system of claim 1, wherein said charge coupled device includes an epitaxial layer directly receiving x-rays, said epitaxial layer having a thickness of between 30 and 500 microns.

17. The imaging system of claim 16, wherein said epitaxial layer has a thickness of between 60 and 300 microns.

18. The imaging system of claim 1, wherein said charge coupled device has an upper surface for directly receiving x-rays, said charge coupled device having a substrate on a back surface thereof, said charge coupled device being oriented such that x-rays are directly received by said upper surface, without first passing through said substrate.

* * * * *